3,471,570
BENZYL DICHLOROMETHYL SULPHONES

Roger Boesch, Vitry-sur-Seine, and Jean Metivier, Paris, France, assignors to Rhone-Poulenc S.A., Paris, France, a French body corporate
No Drawing. Filed Jan. 9, 1967, Ser. No. 607,874
Claims priority, application France, Jan. 11, 1966, 45,541
Int. Cl. A01n 9/00; C07c 147/06; C07d 13/00
U.S. Cl. 260—607                                                3 Claims

---

ABSTRACT OF THE DISCLOSURE

Benzyl dichloromethyl sulphone and derivatives thereof optionally carrying at most three substituents on the benzene ring selected from halogen, alkyl, alkoxy and dichloromethylsulphonylmethyl, or optionally carrying on the benzene ring an alkylenedioxy group, and possibly another substituent selected from halogen, alkyl, alkoxy and dichloromethylsulphonylmethyl, are useful as acaricides. They can be prepared by reacting a benzyl halide with an alkali metal, or ammonium, dichloromethylsulphinate.

---

This invention relates to new benzyl derivatives, to a process for their preparation, and compositions containing them.

According to the present invention, there are provided the new benzyl derivatives of the general formula:

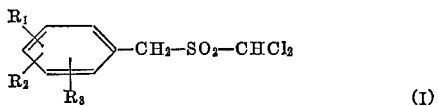

(I)

wherein $R_1$, $R_2$ and $R_3$ are the same or different and each represents a hydrogen atom, a straight or branched alkyl or alkoxy group containing 1 to 4 carbon atoms, a halogen atom or a dichloromethylsulphonylmethyl group, i.e. $Cl_2CH-SO_2-CH_2-$, or $R_1$ and $R_2$ together represent an alkylenedioxy group with $R_3$ representing an atom or group as hereinbefore specified.

According to a feature of the invention, these benzyl derivatives are prepared by the process which comprises reacting a compound of the general formula:

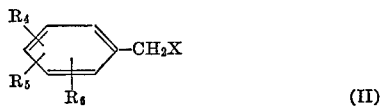

(II)

(wherein $R_4$, $R_5$ and $R_6$ are the same or different and each represents a —$CH_2X$ group or has the same significance as $R_1$, $R_2$ and $R_3$, respectively, as above defined, and X represents a halogen atom) with an alkali metal, or ammonium, dichloromethylsulphinate. The reaction is advantageously carried out in an inert organic solvent such as an aromatic hydrocarbon (for example benzene or toluene), a chlorinated solvent (for example carbon tetrachloride) or an amide (for example dimethylformamide), at a temperature between 10 and 100° C. in the presence of a catalyst such as sodium iodide.

The alkali metal and ammonium dichloromethylsulphinates are obtained by hydrolysis of perchloromethylmercaptan with aqueous, alkali metal hydroxide or ammonia, respectively.

The benzyl derivatives of Formula I have remarkable acaricidal properties. Preferred compounds are those in which $R_1$ represents a hydrogen or halogen atom, or a methyl, isopropyl, methoxy or dichloromethylsulphonylmethyl group, and $R_2$ and $R_3$ each represent a hydrogen or halogen atom, or $R_1$ and $R_2$ together represent a methylenedioxy group and $R_3$ represents a hydrogen or halogen atom; in particular benzyl dichloromethyl sulphone, 4-chlorobenzyl dichloromethyl sulphone, 2-chlorobenzyl dichloromethyl sulphone and 2,4-dichlorobenzyl dichloromethyl sulphone.

According to a further feature of the present invention, there are provided acaricidal compositions containing, as active ingredient, at least one benzyl derivative of Formula I in association with one or more diluents compatible with the benzyl derivative and suitable for use in agricultural acaricidal compositions. Preferably the compositions contain between 0.005 and 90% by weight of benzyl derivative. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the benzyl derivative is dissolved or dispersed. The compositions may thus take the form of suspensions, emulsions or solutions in organic or aqueous-organic media, for example aromatic hydrocarbons such as toluene or xylene, ketones such as acetophenone, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the benzyl derivatives may be used in the form of self-emulsifying concentrates containing the active substance dissolved in the emulsifying agent or in a solvent containing an emulsifying agent compatible with the benzyl derivative and solvent, a simple addition of water to such concentrates producing compositions ready for use.

The solid compositions are preferably prepared by grinding the benzyl derivative with the solid diluent, or by impregnating the solid diluent with a solution of the benzyl derivative in a volatile solvent, evaporating the solvent, and if necessary grinding the product so as to obtain a powder, and may optionally incorporate a wetting or dispersing agent, for example of the types hereinbefore described.

The benzyl derivatives of Formula I are preferably employed for acaricidal purposes in a quantity of 20 to 100 g. of benzyl derivative per hectolitre of water.

The following examples illustrate the invention.

EXAMPLE I 3-methylbenzyl bromide (18.5 g.) dissolved in dimethylformamide (20 cc.) is added over the course of about 5 minutes to a solution obtained from sodium dichloromethylsulphinate (20.5 g.), sodium iodide (1.5 g.) and dimethylformamide (80 cc.). The mixture is then heated for 1 hour at 50° C. After cooling to 20° C., the reaction mixture is poured into water (400 cc.) and 3-methylbenzyl dichloromethyl sulphone is precipitated. The product is washed with water (2× 50 cc.) and with petroleum ether (2× 50 cc.) and then dried in vacuo. Crude 3-methylbenzyl dichloromethyl sulphone (26.5 g.), melting at 98–100° C., is obtained. After recrystallisation from diisopropyl ether the product melts at 102° C.

The sodium dichloromethylsulphinate starting material is obtained by hydrolysis of perchloromethylmercaptan with aqueous sodium hydroxide.

The products of Formula I specified in the following table, in which the position of substituents on the benzene ring is indicated, were prepared by the procedure described above starting with appropriate compounds of Formula II.

TABLE

| —$R_1$ | —$R_2$ | —$R_3$ | Melting point, °C. |
|---|---|---|---|
| —H | —H | —H | 104 |
| —$CH_3$(2) | —H | —H | 104 |
| —$CH_3$(4) | —H | —H | 115 |
| —Cl (2) | —H | —H | 95 |
| —Cl (4) | —H | —H | 95 |
| —F (4) | —H | —H | 122 |
| —Cl (2) | —Cl (4) | —H | 95 |
| —Cl (3) | —Cl (4) | —H | 125 |
| —$CH_2$—$SO_2$—$CHCl_2$ (4) | —H | —H | 270 |
| —O—$CH_2$—O— (3, 4) | | —Br (6) | 142 |
| —Br (3) | —H | —H | 98 |
| —Cl (2) | —Cl (4) | —Cl (5) | 96 |
| —$CH(CH_3)_2$ (4) | —H | —H | 99 |
| —$OCH_3$ (4) | —H | —H | 110 |

EXAMPLE II

A condensation product of octylphenol and ethylene oxide containing 10 moles of ethylene oxide per mole of octylphenol (2.5 g.), polyoxyethylenesorbitan monolaurate (2.5 g.) and a mixture of acetophenone and toluene to make the mixture up to 100 cc., are added to benzyl dichloromethyl sulphone (20 g.). The solution so obtained after suitable dilution of this concentrate with water is used to kill red spiders.

Depending on the desired effect, concentrations of 20 to 100 g. of benzyl derivative per hectolitre of solution are required in order to obtain good results.

We claim:
1. A benzyl derivative of the formula:

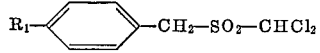

wherein $R_1$ represents hydrogen or chlorine.

2. The benzyl derivative according to claim 1 which is benzyl dichloromethyl sulphone.

3. The benzyl derivative according to claim 1 which is 4-chlorobenzyl dichloromethyl sulphone.

References Cited

Barr: "J.A.C.S.," vol. 63 (1941), pp 105–107.
Lewis: "J.A.C.S.," vol 73 (1951), pp. 2109–2113.

CHARLES B. PARKER, Primary Examiner
D. R. PHILLIPS, Assistant Examiner

U.S. Cl. X.R.
260—340.5; 424—278, 337